3,475,762
TRANSLUCENT DISPLAY ELEMENTS
Francis Neville Chadwick, Abbots Langley, Watford, David Broad, Cut Hedge, Gosfield, and David Leonard Boutle, Langford, near Maldon, England, assignors to E. N. Mason & Sons Limited, Colchester, Essex, England, a British company
Filed Aug. 19, 1965, Ser. No. 481,140
Claims priority, application Great Britain, Aug. 19, 1964, 33,948/64, 33,949/64
Int. Cl. G11b 7/24
U.S. Cl. 346—135                             2 Claims

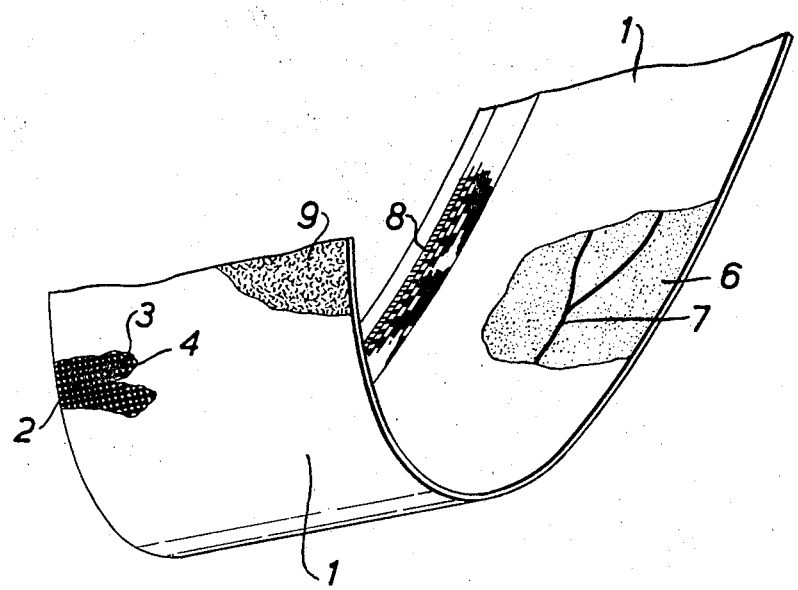

ABSTRACT OF THE DISCLOSURE

A navigational chart for use with computerized navigational equipment in aircraft is made of a plastic film and has a computer track along one edge. A dark image of the chart course is shown on a background comprising a light scattering screen which enables the image to be seen in conditions of bright sunlight. The chart course image and the computer track are carried by a photographic emulsion on one side of the film and the opposite side has a hard coating to provide the film with anti-curl properties.

---

The present invention relates to film element bearing the image of a navigation chart and intended for back-lighting by an enclosed artificial source of light. The invention has particular application in the field of aircraft navigation although it is not confined thereto.

In aircraft navigation systems such as the "Decca" system wherein radio signals are transmitted by a master station to an aircraft and also to what are known as "slave" stations which re-transmit them to the aircraft so that the time-lag between the original and the retransmitted signals can be measured and the position of the aircraft fixed in relation to the known position of the master and slave stations, it is known to provide a computer in the aircraft which analyses the information derived from the signals and translates this into a plot on a recorder comprising a moveable chart. It is advantageous for the chart to be provided on a translucent film which is back-lit, the said film being a flexible strip or band having an information track printed or otherwise produced along one longitudinal side margin thereof. The chart defines a course and trace equipment gives a visual indication on the back of the film of the actual course taken by the vehicle as the film passes under a light-transmitting cover of a box containing the source of artificial light.

Such a back-lit display element, however, suffers from a serious disadvantage in that it is difficult to view in conditions of bright ambient light, e.g., bright sunlight, due to the tendency for the display surface under such conditions to exhibit an insufficient contrast between the image and the background therefor formed by the film and this is especially so when an aircraft is flying above cloud level and especially in the stratosphere. Changes may occur rapidly from ambient darkness to extreme brilliance and vice versa and it is highly desirable to provide display film material which will be effective under such varying conditions.

The present invention aims to provide display film material which will make the image clearly discernible under such or other ambient light conditions which would tend to render the image obscure or illegible to the viewer.

The present invention comprises display film material and a light scattering screen constructed and arranged to produce a sharp contrasting background for the image in conditions of high-intensity ambient light. The invention also comprises film material having such a screen and adapted to receive an image, e.g., photographically.

The said screen is preferably such as to permit the image to be readily discernible by transmission through the material of light from an enclosed back-lit source in dark or low-light intensity ambient conditions.

The film base material is preferably a plastics material, for instance of a polyester or polyolefin plastics material and the screen preferably comprises discrete light-scattering material distributed in a plastics layer bonded to the film base material.

The image is preferably in the form of or comprises a navigation chart. The film-base material, when mounted in suitable apparatus for providing the back illumination from a closed artificial source, serves as a display element with the screen disposed between the source of back-lighting and the chart and enables the chart to be clearly displayed with a contrasting background under all conditions of ambient light. A screen may thus be provided which acts to allow the chart to be clearly visible even in such brilliant ambient light conditions as may be present in the stratosphere and when, in the absence of the screen, the chart would be illegible or difficult to follow. The element is therefore admirably suited for use on aircraft and especially in conjunction with a ground station or stations equipped with a duplicate or duplicates in conjunction with a system as aforesaid.

For the base material is is highly advantageous especially for the precision operation of the computer tract, to use a flexible film material having a high strength and dimensional stability under widely varying conditions of temperature, pressure and humidity and having a high resistance to tensile stresses and ageing, such as one where strength is obtained by orientation of the film material in a stretching operation.

We have found that a polyester film material is particularly suitable, and especially polyethylene terephthalate film. Other plastics film materials may be used such as orientated polycarbonate, polyethylene or polypropylene film materials. We have obtained particularly good results with "Melinex" and "Mylar" film materials.

We have however found that, with such materials and particularly the orientated polyester films aforesaid, it is difficult successfully to retain screen-producing compositions, such as a pigment material, intact on the film during normal usages of the display film unless the film material has been pre-treated to promote adhesion of the said composition. The film may be pre-treated in known manner for this purpose, but we have produced a composition which is especially suitable for printing the screen on a polyester or polyolefine film without pre-treating the surface of the film material. This composition incorporates pigment particles and comprises a curable thermoplastic material and a cross-linking agent adapted to bond or improve the bond of the said thermoplastics material to an untreated surface of a polyethylene terephthalate film under such temperature conditions as will produce an effective bond but will not cause the film base material to shrink or distort. It is believed that a composition as thus defined will be suitable when it is applied to other of the film base materials hereinbefore mentioned. It has further been found that particles of titanium dioxide pigment are particularly suitable for the discrete light-scattering material.

A suitable spirit base such as ethyl or methyl alcohol with water e.g., in the ratio of 4:1 serves well as a solvent to render the plastics materials of the composition readily printable.

Particularly good results have been obtained when the curable thermoplastics material of the composition consists of or comprises a polyvinyl acetal resin advantageously in the form of a polyvinyl formal resin produced for example in known manner from polyvinyl acetate hydrolised by at least partially replacing acetyl with hydroxyl groups, followed by the introduction of an aldehyde, such as formaldehyde to replace all or most of the hydroxyl groups. In this case the cross-linking agent may advantageously be a suitable melamine derivative, the polyvinyl acetal resin being advantageously present with the cross-linking agent in a ratio of approximately 4:1. A curing catalyst may be applied to the composition when printing is to take place. A substance such as diatomaceous silica may be present in the composition to act as an extender and to promote adhesion.

It has been found that a very advantageous manner of printing a regular screen on the film base material and with a composition as aforesaid is by the intaglio method. Successful results have been obtained by printing the screen as a line screen so that multiple unprinted areas are formed in which the film base remains uncovered. These areas may be left by areas in relief on an intaglio cylinder when the background recessed area or areas thereof is or are charged with the composition. In such a case the screen is provided by a continuous background of composition to multiple uncovered areas of the film base material, but a continuous background may be formed by the uncovered film base material to multiple separate areas e.g., lines of dots, of the composition.

The said background may be produced in the base material or on either face thereof or may be in or on a film element adjacent to and behind said base material. The image may be located on the same side of the base material as the screen, or the image may be at the front and the screen at the back. The composition specifically mentioned may be printed to give a white background effect to a black image in the high-intensity light conditions.

The screen may conform to an intersecting line or chequer pattern. A pattern of a line screen which has been found to be suitable for a normal viewing distance of approximately 30 inches is one of 80 lines per inch where the ratio of composition to clear areas in the screen is approximately 50:50, plus or minus 10%.

We have found that screens with more than 120 lines per inch or less than 60 lines per inch are undesirable. A screen of 70 to 90 lines per inch affords a good compromise as between the conditions when the back-lighting is alone relied on and the conditions where the ambient light is at its highest intensity level.

Although a screen of regular pattern is preferred, this is not essential.

A light sensitive layer may be applied either to the screen or to the opposite face of the base material to that carrying the screen and the image, for instance, a chart, produced photographically in the light-sensitive layer.

The film base material may be an inherently translucent material or it may be transparent.

The light-sensitive layer may be a silver halide emulsion layer incorporating a matting agent, e.g., starch grains, to provide or enhance translucency in the display material and if desired also to give the material drafting or marking properties. A hard backing layer may be provided, e.g., of gelatine treated to give the desired hardness and carrying an anti-halation substance which is discharged during processing. The backing layer may be of such coating weight in relation to the coating weight of the light-sensitive emulsion as to provide anti-curl properties. The backing layer may be such as to facilitate a trace being recorded by the trace equipment to mark visually from the back the actual vehicular course during travel.

According to another embodiment, the screen, if at the back, may be produced directly on the film base material and a surface matting of for example ground silica produced on the screen for marking purposes. Alternatively the matting surface may be produced on one face of the base material and the screen on the other.

When the back lighting is predominant, the light is transmitted directly through the display material in the non-image areas and the image of the chart is coherently resolved under conditions of low external light intensity or darkness. With ambient light of high intensity however, especially very bright sunlight, ambient light is irregularly reflected or back-scattered by the screen behind the chart image (with some absorption) and even at very high light intensities the chart can be coherently resolved on a contrasting background.

The screen may be produced over the whole width or area of the element or the screen may be produced only on the chart bearing portion of the element and the information track produced on a non-screen area. The track may be produced photographically on a photographic emulsion layer when present.

In order that the invention may be more clearly understood reference is hereinafter made to the accompanying drawing in which a display element according to the invention is illustrated by way of example.

The film base material 1 in the figure is a translucent strip or band of polyethylene terephthalate, e.g., one of the materials known as "Mylar" and "Melinex," of a width of about 11½" and a thickness of 0.002". Printed on one face of this strip or band with a composition, for instance, as is hereinafter given, to an average thickness of, for example, about 5µ is a visual modulating screen 2, the pattern of which is diagrammatically illustrated on a highly enlarged scale as comprising lines of unprinted discrete areas 3 and a background 4 printed by an intaglio cylinder of the said composition. The actual size of the discrete areas and the interspacing thereof in the rows is such that there are about 80 lines of said discrete areas in the inch, and the printed and unprinted areas are in the ratio of about 50:50, the clear areas being in regular pattern. The lines of discrete areas as aforesaid may be at an angle, e.g., between 70° and 80°, e.g., 75° to the longitudinal edge of the strip or band.

The front face of the strip is provided with a light sensitive emulsion layer 6 and the chart 7 is photographically produced in black or a colour of the requisite light-absorbing character and of high definition on the said emulsion. The visual density of the developed non-image part of the emulsion should be such as not to interfere with the efficiency of the element. A suitable emulsion is a silver halide emulsion applied on a suitable substratum. The observe face may have a backing layer 9 of gelatine applied on a suitable substratum formed over the screen and prepared to give the element anti-halation and anti-curl properties and to facilitate a trace being recorded. The strip is provided with the information track (indicated at 8) which may be produced photographically or otherwise in black or of a density to suit the requirements of the computer.

The strip will be disposed with the screen between the back-light and the chart, i.e., the chart is exposed to the viewer in front of the said screen.

The screen is however preferably produced on the front side of the base material and the chart produced directly thereon or photographically on an emulsion thereon.

It is found that however lines of the image cross the lines of the screen the image remains visually uninterrupted and visible from both faces of the element.

A suitable composition from which the screen may be produced is as follows:

| | |
|---|---|
| Formvar 7/70 (a commercially available polyvinyl acetal resin manufactured by Shawinigan Resins Limited) _____ g__ | 40 |
| Cymel 200 (hexamethoxymethyl melamine made by Cyanamid Limited) _____ g__ | 10 |
| Celite 165S (a diatomaceous silica pigment) __g__ | 2 |
| Runa RH–20—Titanium dioxide pigment _____g__ | 13 |
| Spirit (ethanol or methanol) _____ml__ | 320 |
| $H_2O$ _____ml__ | 80 |

An advantageous method of forming the composition and of printing therewith is as follows:

The Formvar is dissolved in the spirit and water in a high-speed mixer; the "Cymel" and then the "Runa" and "Celite" compounds are added. The whole is mixed to the required consistency, and then transferred from the mixer to a conventional Sand Mill and there treated for a period of say five minutes. To bring the treated mixture into condition for use, a catalyst is added. This may be as follows: Catalyst AC31 (a reaction accelerator, 30% HCl in spirit made by B.I.P. Chemicals Limited), 2 ml. After printing the ink is subjected to a temperature of 220° F., e.g., by placing the printed article in a suitable oven for one-half a minute or for shorter periods at higher temperatures. Under such conditions the composition can be bonded to orientated polyethylene terephthalate film material without shrinkage of the material.

Printing of the screen may advantageously be by a rotogravure cylinder.

What we claim is:

1. A navigational chart in the form of a plastics film in strip or band form bearing on a surface thereof the dark image of the chart course and carried by a photographic emulsion, a control track image laterally carried by said emulsion, a patterned light-scattering screen deposited on the film in a pigment material to whiten the background for the said chart course image, said emulsion being super-imposed on the said screen, and a hard layer on the reverse side of said film to the said screen and emulsion to provide the film with anti-curl properties and to enable tracer equipment to mark on the said side of the film.

2. A plastics film in a strip or band form comprising a marginal computer track and the black image of a navigational chart and wherein the background formed by the film for the said image comprises a regular screen printed in a white pigment material in continuous or discontinuous lines and in a line density in the range of from 60 to 120 lines per inch so as to be carried by the film behind the image plane, the said background permitting sufficient light-transmission from an enclosed artificial back-light source to enable the image to be readily contrasted with the background in dark-room conditions and being adapted by scattering sunlight incident thereon to have its whiteness manifested to the viewer in sharp contrast with the image while the film remains back-lit, the said pigment material being in a thermoplastics carrier material comprising a polyvinyl acetal resin with a melamine derivative cross-linking agent capable of bonding or substantially improving the bond of the thermoplastics material to an untreated surface of a polyethylene terephthalate film material under such temperature conditions as will not shrink or distort the film material.

References Cited

UNITED STATES PATENTS

| | | | |
|---|---|---|---|
| 1,281,714 | 10/1918 | Thornton | 352—234 |
| 2,378,252 | 6/1945 | Staehle et al. | 350—126 |
| 2,551,086 | 5/1951 | Ball et al. | 352—234 |
| 2,944,462 | 7/1960 | Harkness | 350—126 |
| 3,014,301 | 12/1961 | Grupe | 161—6 |
| 3,113,313 | 12/1963 | Roberts | 346—32 X |
| 3,273,455 | 9/1966 | Kaufmann | 161—3.5 |
| 3,350,715 | 10/1967 | King | 346—135 X |
| 3,351,409 | 11/1967 | McGuire | 240—46.57 X |

NORTON ANSHER, Primary Examiner

MONROE H. HAYES, Assistant Examiner

U.S. Cl. X.R.

161—3.5, 6